(12) United States Patent  
Campbell et al.

(10) Patent No.: US 7,350,441 B2
(45) Date of Patent: *Apr. 1, 2008

(54) CUTTING TOOL HAVING VARIABLE MOVEMENT AT TWO SIMULTANEOUSLY INDEPENDENT SPEEDS IN AN X-DIRECTION INTO A WORK PIECE FOR MAKING MICROSTRUCTURES

(75) Inventors: Alan B. Campbell, Santa Rosa, CA (US); Dale L. Ehnes, Cotati, CA (US); Daniel S. Wertz, Sebastopol, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/273,875

(22) Filed: Nov. 15, 2005

(65) Prior Publication Data

US 2007/0107565 A1    May 17, 2007

(51) Int. Cl.
    B23B 1/00    (2006.01)
(52) U.S. Cl. .......................... 82/123; 82/70.1
(58) Field of Classification Search ............. 82/1.11, 82/70.1, 123, 157, 118; 83/76.8, 368, 881; 29/561, 563
See application file for complete search history.

(56) References Cited

U.S. PATENT DOCUMENTS

| 5,063,322 | A | * | 11/1991 | Sugita et al. ............... 310/341 |
| 5,291,812 | A | | 3/1994 | Yen et al. |
| 5,467,675 | A | | 11/1995 | Dow et al. |
| 6,040,653 | A | | 3/2000 | O'Neill |
| 6,170,367 | B1 | * | 1/2001 | Keller et al. ............... 82/1.11 |
| 6,237,452 | B1 | | 5/2001 | Ludwick et al. |
| 6,322,236 | B1 | | 11/2001 | Campbell et al. |
| 6,354,709 | B1 | | 3/2002 | Campbell et al. |
| 6,356,391 | B1 | | 3/2002 | Gardiner et al. |
| 6,560,026 | B2 | | 5/2003 | Gardiner et al. |
| 6,581,286 | B2 | | 6/2003 | Campbell et al. |
| 6,597,968 | B2 | | 7/2003 | Matsumoto et al. |
| 6,707,611 | B2 | | 3/2004 | Gardiner et al. |

(Continued)

FOREIGN PATENT DOCUMENTS

JP    63-306854    12/1988

(Continued)

OTHER PUBLICATIONS

UltraMill Research@PEC,NCSU, "Vibration Assisted Machining: Ultramill," North Carolina State University Percision Engineering Center, Raleigh, NC 27695, [http://airy.pec.ncsu.edu/PEC/research/projects/ultramill/index.html], Spring 2000, pp. 2.

(Continued)

*Primary Examiner*—Willmon Fridie, Jr.
(74) *Attorney, Agent, or Firm*—Lance L. Vietzke

(57) ABSTRACT

A cutting tool assembly having a tool post capable of lateral movement along a work piece to be cut and an actuator with a tool tip. The actuator provides for variable control of the movement of the tool tip in an x-direction into the work piece at two simultaneously independent speeds for use in making microstructures in the work piece.

20 Claims, 5 Drawing Sheets

U.S. PATENT DOCUMENTS

| | | |
|---|---|---|
| 6,811,274 B2 | 11/2004 | Olczak |
| 6,814,113 B1 * | 11/2004 | Daniels .................... 144/351 |
| 6,844,950 B2 | 1/2005 | Ja Chisholm et al. |
| 6,845,212 B2 | 1/2005 | Gardiner et al. |
| 6,862,141 B2 | 3/2005 | Olczak |
| 6,909,482 B2 | 6/2005 | Olczak |
| 6,925,915 B1 | 8/2005 | Claesson et al. |
| 6,945,099 B1 * | 9/2005 | Su et al. ...................... 73/105 |
| 6,951,400 B2 | 10/2005 | Chisholm et al. |
| 6,952,627 B2 | 10/2005 | Olczak et al. |
| 7,089,836 B2 * | 8/2006 | Kato et al. ................. 82/1.11 |
| 7,101,694 B2 * | 9/2006 | Hirokawa et al. .......... 435/189 |
| 2002/0035231 A1 | 3/2002 | Whitehouse et al. |
| 2003/0108710 A1 | 6/2003 | Coyle et al. |
| 2003/0112521 A1 | 6/2003 | Gardiner et al. |
| 2004/0035266 A1 | 2/2004 | Montesanti et al. |
| 2004/0045419 A1 | 3/2004 | Bryan et al. |
| 2004/0109663 A1 | 6/2004 | Olczak |
| 2005/0223858 A1 | 10/2005 | Lu et al. |

FOREIGN PATENT DOCUMENTS

| | | |
|---|---|---|
| JP | 08-174320 | 7/1996 |
| JP | 9-275689 | 10/1997 |
| JP | 10-118888 | 5/1998 |
| JP | 2004098230 A | 4/2004 |
| JP | 2005-014169 | 1/2005 |
| KR | 2004096676 A | 9/2005 |
| WO | WO 97/48521 | 12/1997 |
| WO | WO 00/25963 | 5/2000 |
| WO | WO 00/50201 | 8/2000 |
| WO | WO 02/06005 A1 | 1/2002 |
| WO | WO 02/37168 A2 | 5/2002 |
| WO | WO 02/37168 A3 | 5/2002 |
| WO | WO 03/086688 A1 | 10/2003 |
| WO | WO 2005/043266 A2 | 5/2005 |
| WO | WO 2005/043266 A3 | 5/2005 |

OTHER PUBLICATIONS

Edward M. Trent & Paul K. Wright, *Metal Cutting*, 4th ed., Butterworth, Heinemann, 2000, pp. 258-260.

Zhang Jin-Hua, *Theory and Technique of Precision Cutting*, Pergamon Press, 1991, Chap. 2, "Nature of Cutting Force Variation in Precision Cutting," pp. 18-31.

M. K. Krueger, S. C. Yoon, D. Gong, S. B. McSpadden Jr., L. J. O'Rourke, R. J. Parten, "New Technology in Metalworking Fluids and Grinding Wheels Achieves Tenfold Improvement in Grinding Performance," Coolants/Lubricants for Metal Cutting and Grinding Conference, Chicago, Illinois, Milacron, Inc. and Oak Ridge National Laboratory, Jun. 7, 2000, pp. 15.

* cited by examiner

CUTTING TOOL HAVING VARIABLE MOVEMENT AT TWO SIMULTANEOUSLY INDEPENDENT SPEEDS IN AN X-DIRECTION INTO A WORK PIECE FOR MAKING MICROSTRUCTURES

REFERENCE TO RELATED APPLICATIONS

The present application is related to U.S. patent applications Ser. Nos. 11/274,723, 11/273,981, and 11/273,884, all of which were filed Nov. 15, 2005 and are incorporated herein by reference.

FIELD OF INVENTION

The present invention relates to diamond machining of microreplication tools used in creating microreplicated structures.

BACKGROUND

Machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

The microstructures can also be made by various other methods. For example, the structure of the master tool can be transferred on other media, such as to a belt or web of polymeric material, by a cast and cure process from the master tool to form a production tool; this production tool is then used to make the microreplicated structure. Other methods such as electroforming can be used to copy the master tool. Another alternate method to make a light directing film is to directly cut or machine a transparent material to form the appropriate structures.

Other techniques include chemical etching, bead blasting, or other stochastic surface modification techniques. However, those techniques are typically not capable of forming the sharp, precise microstructures, and the breadth of features, desired to obtain the appropriate light diffusion characteristic achieved with a cutting tool using the methods of the present invention. In particular, these methods are not capable of producing highly accurate, repeating structures because of the inherent impreciseness and unrepeatability associated with chemical etching, bead blasting, and other stochastic surface modification techniques.

SUMMARY OF INVENTION

A first cutting tool assembly includes a tool post and an actuator configured for attachment to the tool post and for electrical communication with a controller. A tool tip attached to the actuator is mounted for movement with respect to a work piece to be cut. The actuator provides for variable control of the movement of the tool tip in an x-direction into the work piece at two simultaneously independent speeds for use in selectively cutting the work piece.

A second cutting tool assembly includes a tool post capable of lateral movement along a work piece to be cut and an actuator configured for attachment to the tool post and for electrical communication with a controller, the actuator including a piezoelectric stack. A tool tip attached to the piezoelectric stack is mounted for movement with respect to the work piece to be cut. The actuator provides for variable control of the movement of the tool tip in an x-direction into the work piece at two simultaneously independent speeds for use in selectively cutting the work piece in order to make microstructures in the work piece.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Cutting Tool System

General diamond turning techniques are described in PCT Published Application WO 00/48037, incorporated herein by reference as if fully set forth. The apparatus used in methods and for making optical films or other films can include a fast servo tool. As disclosed in WO 00/48037, a fast tool servo (FTS) is a solid state piezoelectric (PZT) device, referred to as a PZT stack, which rapidly adjusts the position of a cutting tool attached to the PZT stack. The FTS allows for highly precise and high speed movement of the cutting tool in directions within a coordinate system as further described below.

Figure 1:
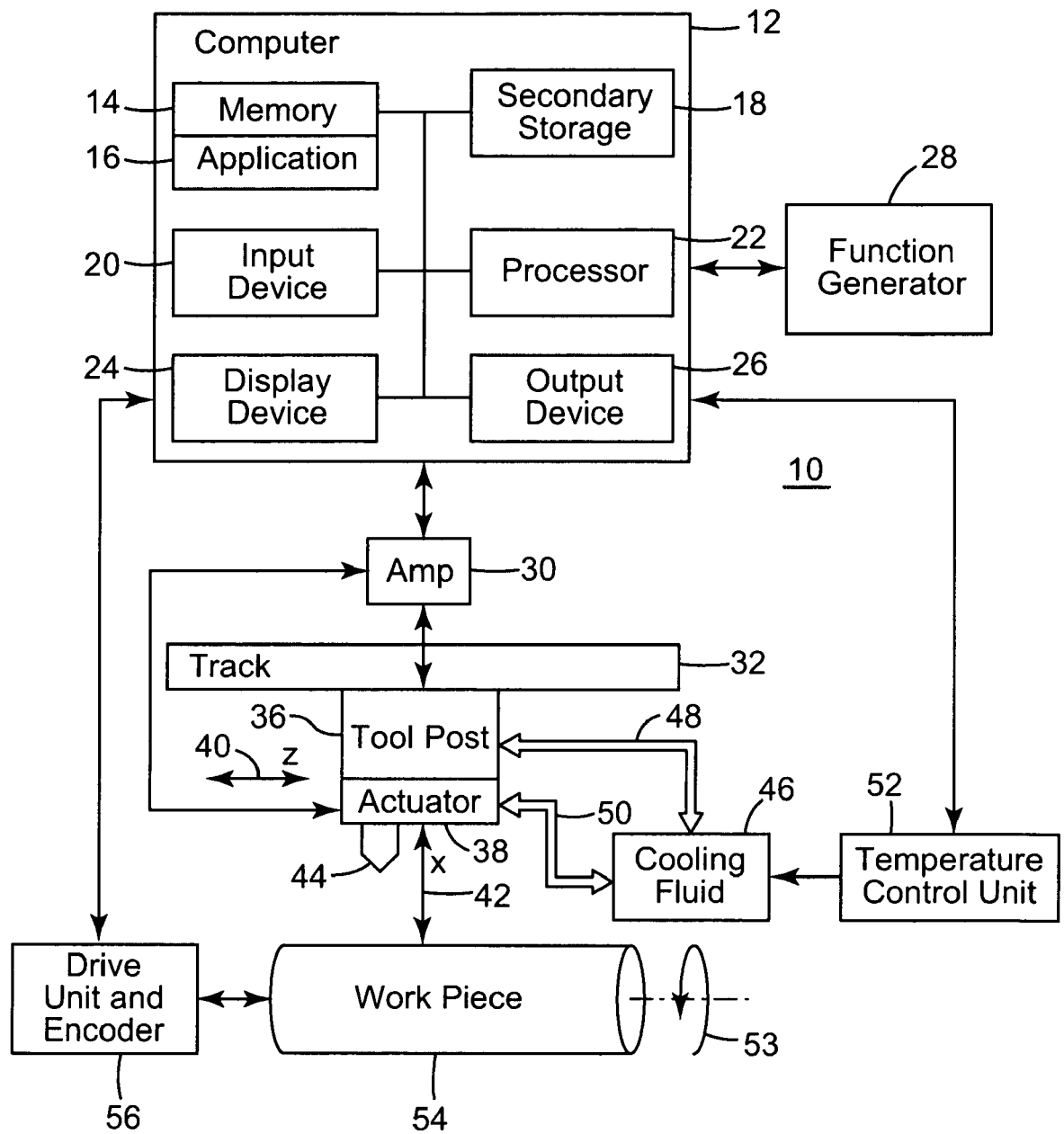
FIG. 1 is a diagram of a cutting tool system for making microstructures in a work piece.

FIG. 1 is a diagram of a cutting tool system 10 for making microstructures in a work piece. Microstructures can include any type, shape, and dimension of structures on, indenting into or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). These dimensions are provided for illustrative purposes only, and microstructures made using the actuators and system described in the present specification can have any dimension within the range capable of being tooled using the system.

System 10 is controlled by a computer 12. Computer 12 has, for example, the following components: a memory 14 storing one or more applications 16; a secondary storage 18 providing for non-volatile storage of information; an input device 20 for receiving information or commands; a processor 22 for executing applications stored in memory 16 or secondary storage 18, or received from another source; a display device 24 for outputting a visual display of information; and an output device 26 for outputting information in other forms such as speakers for audio information or a printer for a hardcopy of information.

The cutting of a work piece 54 is performed by a tool tip 44. An actuator 38 controls movement of tool tip 44 as work piece 54 is rotated by a drive unit and encoder 56, such as an electric motor controlled by computer 12. In this example, work piece 54 is shown in roll form such as a hard copper roll; however, it can be implemented in planar form and make use of other materials for machining. For example, the work piece can be alternatively implemented with aluminum, nickel, steel, or plastics (e.g., acrylics). The particular material to be used may depend, for example, upon a particular desired application such as various films made using the machined work piece. Actuator 38, and the actuators described below, can be implemented with stainless steel, for example, or other materials.

Actuator 38 is removably connected to a tool post 36, which is in turn located on a track 32. The tool post 36 and actuator 38 are configured on track 32 to move in both an x-direction and a z-direction as shown by arrows 40 and 42. Computer 12 is in electrical connection with tool post 36 and actuator 38 via one or more amplifiers 30. When functioning as a controller, computer 12 controls movement of tool post 36 along track 32 and movement of tool tip 44 via actuator 38 for machining work piece 54. If an actuator has multiple PZT stacks, it can use separate amplifiers to independently control each PZT stack for use in independently controlling movement of a tool tip attached to the stacks. Computer 12 can make use of a function generator 28 in order to provide waveforms to actuator 38 in order to machine various microstructures in work piece 54, as further explained below.

The machining of work piece 54 is accomplished by coordinated movements of various components. In particular, the system, under control of computer 12, can coordinate and control movement of actuator 38, via movement of tool post 36, along with movement of the work piece in the c-direction and movement of tool tip 44 in one or more of the x-direction, y-direction, and z-direction, those coordinates being explained below. The system typically moves tool post 36 at a constant speed in the z-direction, although a varying speed may be used. The movements of tool post 36 and tool tip 44 are typically synchronized with the movement of work piece 54 in the c-direction (rotational movement as represented by line 53). All of these movements can be controlled using, for example, numerical control techniques or a numerical controller (NC) implemented in software, firmware, or a combination in computer 12.

Work piece 54, after having been machined, can be used to make films having the corresponding microstructures for use in a variety of applications. Examples of those films include optical films, friction control films, and microfasteners or other mechanical microstructured components. The films are typically made using a coating process in which a material in a viscous state is applied to the work piece, allowed to at least partially cure, and then removed. The film composed of the cured material will have substantially the opposite structures than those in the work piece. For example, an indentation in the work piece results in a protrusion in the resulting film.

Cooling fluid 46 is used to control the temperature of tool post 36 and actuator 38 via lines 48 and 50. A temperature control unit 52 can maintain a substantially constant temperature of the cooling fluid as it is circulated through tool post 36 and actuator 38. Temperature control unit 52 can be implemented with any device for providing temperature control of a fluid. The cooling fluid can be implemented with an oil product, for example a low viscosity oil. The temperature control unit 52 and reservoir for cooling fluid 46 can include pumps to circulate the fluid through tool post 36 and actuator 38, and they also typically include a refrigeration system to remove heat from the fluid in order to maintain it at a substantially constant temperature. Refrigeration and pump systems to circulate and provide temperature control of a fluid are known in the art. In certain embodiments, the cooling fluid can also be applied to work piece 54 in order to maintain a substantially constant surface temperature of the material to be machined in the work piece.

Figure 2:
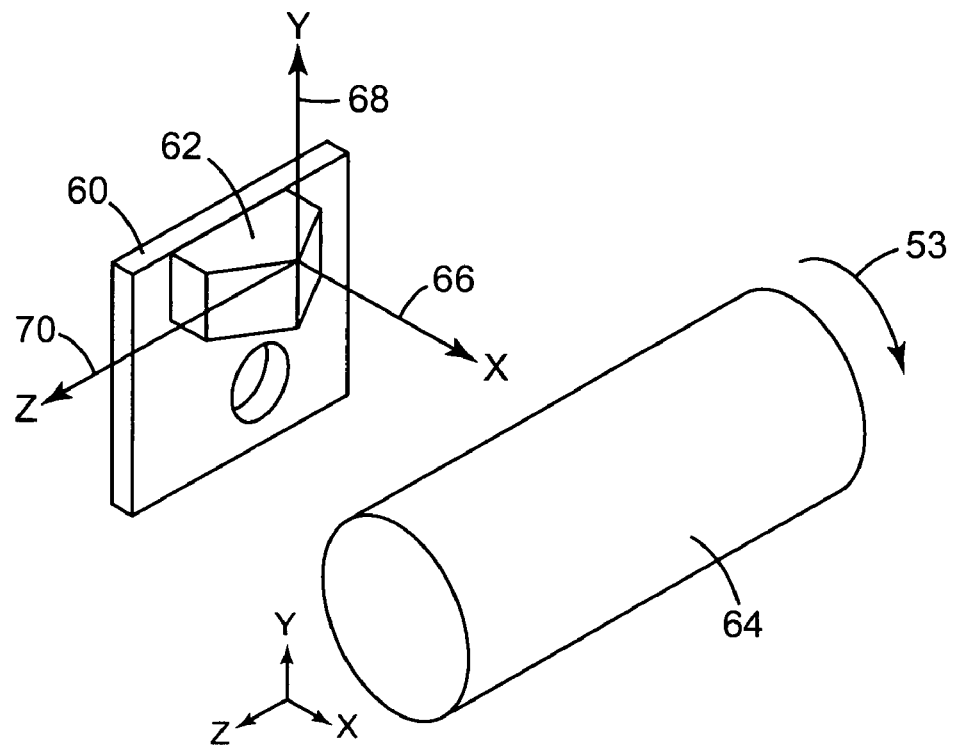
FIG. 2 is a diagram illustrating a coordinate system for a cutting tool.

FIG. 2 is a diagram illustrating a coordinate system for a cutting tool such as system 10. The coordinate system is shown as movement of a tool tip 62 with respect to a work piece 64. Tool tip 62 may correspond with tool tip 44 and is typically attached to a carrier 60, which is attached to an actuator. The coordinate system, in this exemplary embodiment, includes an x-direction 66, a y-direction 68, and a z-direction 70. The x-direction 66 refers to movement in a direction substantially perpendicular to work piece 64. The y-direction 68 refers to movement in a direction transversely across work piece 64 such as in a direction substantially parallel to a plane of rotation of work piece 64. The z-direction 70 refers to movement in a direction laterally along work piece 64 such as in a direction substantially perpendicular to a plane of rotation of work piece 64. The rotation of the work piece is referred to as the c-direction, as also shown in FIG. 1. If the work piece is implemented in planar form, as opposed to roll form, then the y-direction and z-direction refer to movement in mutually orthogonal directions across the work piece in directions substantially perpendicular to the x-direction.

The system 10 can be used for high precision, high speed machining. This type of machining must account for a variety of parameters, such as the coordinated speeds of the components and the work piece material. It typically must take into consideration the specific energy for a given volume of metal to be machined, for example, along with the thermal stability and properties of the work piece material. Cutting parameters relating to machining are described in the following references, all of which are incorporated herein by reference as if fully set forth: Machining Data Handbook, Library of Congress Catalog Card No. 66-60051, Second Edition (1972); Edward Trent and Paul Wright, Metal Cutting, Fourth Edition, Butterworth-Heinemann, ISBN 0-7506-7069-X (2000); Zhang Jin-Hua, Theory and Technique of Precision Cutting, Pergamon Press, ISBN 0-08-035891-8 (1991); and M. K. Krueger et al., New Technology in Metalworking Fluids and Grinding Wheels Achieves Tenfold Improvement in Grinding Performance, Coolant/Lubricants for Metal Cutting and Grinding Conference, Chicago, Ill., U.S.A., Jun. 7, 2000.

PZT Stack, Tool Tip Carrier, and Tool Tip

Figure 3:
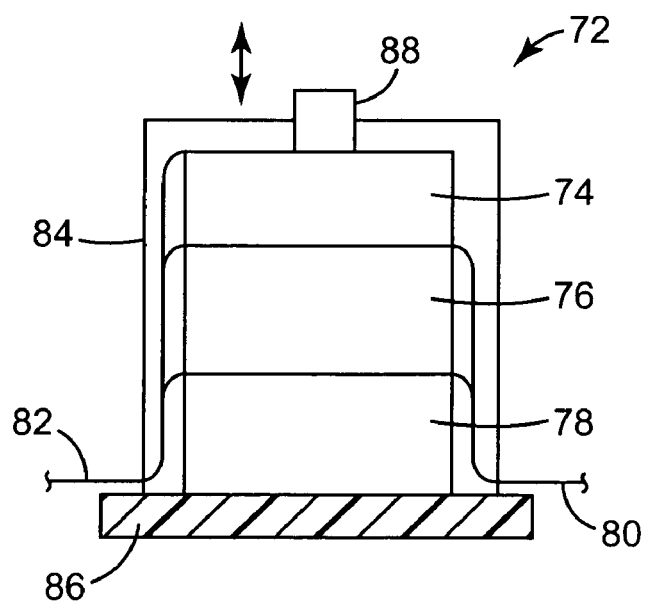
FIG. 3 is a diagram of an exemplary PZT stack for use in a cutting tool.

FIG. 3 is a diagram of an exemplary PZT stack 72 for use in a cutting tool. A PZT stack is used to provide movement of a tool tip connected to it and operates according to the PZT effect, which is known in the art. According to the PZT effect, an electric field applied to certain types of materials causes expansion of them along one axis and contraction along another axis. A PZT stack typically includes a plurality of materials 74, 76, and 78 enclosed within a casing 84 and mounted on a base plate 86. The materials in this exemplary embodiment are implemented with a ceramic material subject to the PZT effect. Three disks 74, 76, and 78 are shown for exemplary purposes only and any number of disks or other materials, and any type of shapes of them, can be used based upon, for example, requirements of particular embodiments. A post 88 is adhered to the disks and protrudes from casing 84. The disks can be implemented with any PZT material such as for example, a barium titanate, lead zirconate, or lead titanate material mixed, pressed, based, and sintered. One such PZT material is available from Kinetic Ceramics, Inc., 26240 Industrial Blvd., Hayward, Calif. 94545, U.S.A. The disks can also be implemented with a magnetostrictive material, for example.

Electrical connections to the disks 74, 76, and 78, as represented by lines 80 and 82, provide electrical fields to them in order to provide for movement of post 88. Due to the PZT effect and based upon the type of electric field applied, precise and small movement of post 88, such as movement within several microns, can be accomplished. Also, the end of PZT stack 72 having post 88 can be mounted against one or more Belleville washers, which provides for preloading of the PZT stack. The Belleville washers have some flexibility to permit movement of post 88 and a tool tip attached to it. Each PZT stack in the actuators described below can also incorporate Belleville washers for preloading or, alternatively, any device mounted against each PZT stack for preloading of it.

Figure 4A:
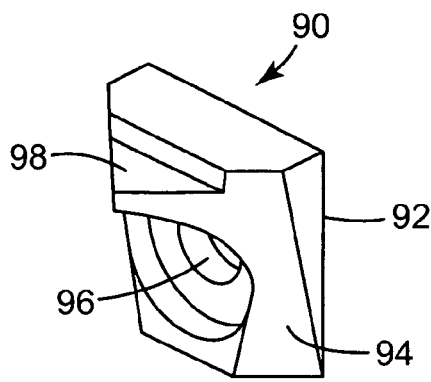
FIG. 4A is a perspective view of a tool tip carrier.
Figure 4B:
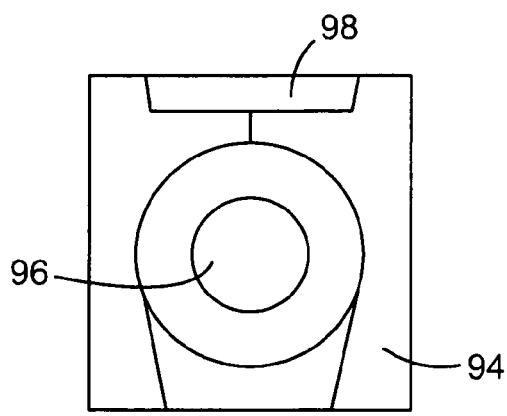
FIG. 4B is a front view of a tool tip carrier for holding a tool tip.
Figure 4C:
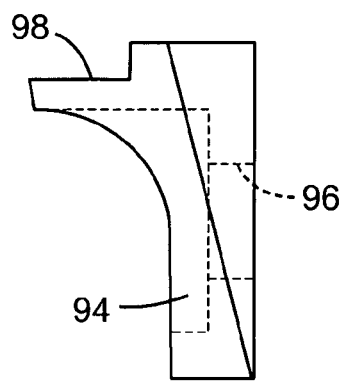
FIG. 4C is a side view of a tool tip carrier.
Figure 4D:
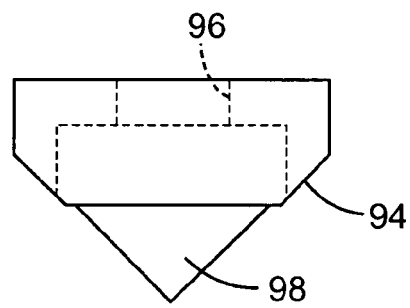
FIG. 4D is a top view of a tool tip carrier.

FIGS. 4A-4D are views of an exemplary tool tip carrier 90, which would be mounted to post 88 of the PZT stack for control by an actuator, as explained below. FIG. 4A is a perspective view of tool tip carrier 90. FIG. 4B is a front view of tool tip carrier 90. FIG. 4C is a side view of tool tip carrier 90. FIG. 4D is a top view of tool tip carrier 90.

As shown in FIGS. 4A-4D, tool tip carrier 90 includes a planar back surface 92, a tapered front surface 94, and a protruding surface 98 with angled or tapered sides. An aperture 96 provides for mounting of tool tip carrier 90 onto a post of a PZT stack. Tapered surface 98 would be used for mounting of a tool tip for machining of a work piece. In this exemplary embodiment, tool tip carrier 90 includes a planar surface to enhance stability of mounting it by providing for more surface area contact when mounted to a PZT stack, and it includes the tapered front surfaces to reduce the mass of it. Tool tip carrier 90 would be mounted to post 88 of the PZT stack by use of an adhesive, brazing, soldering, a fastener such as a bolt, or in other ways.

Other configurations of tool tip carriers are possible based, for example, upon requirements of particular embodiment. The term "tool tip carrier" is intended to include any type of structure for use in holding a tool tip for machining a work piece. Tool tip carrier 90 can be implemented with, for example, one or more of the following materials: sintered carbide, silicon nitride, silicon carbide, steel, or titanium. The material for tool tip carrier 90 preferably is stiff and has a low mass.

Figure 5A:
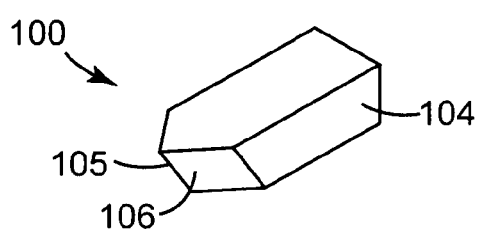
FIG. 5A is a perspective view of a tool tip.
Figure 5B:
FIG. 5B is a front view of a tool tip.
Figure 5C:
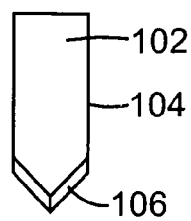
FIG. 5C is a bottom view of a tool tip.
Figure 5D:
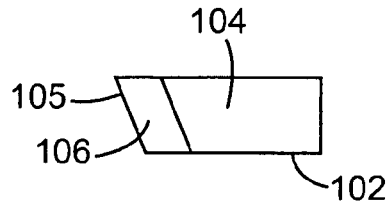
FIG. 5D is a side view of a tool tip.

FIGS. 5A-5D are views of an exemplary tool tip 100, which would be secured to surface 98 of tool tip carrier 90 such as by use of an adhesive, brazing, soldering, or in other ways. FIG. 5A is a perspective view of tool tip 100. FIG. 5B is a front view of tool tip 100. FIG. 5C is a bottom view of tool tip 100. FIG. 5D is a side view of tool tip 100. As shown in FIGS. 5A-5D, tool tip 100 includes sides 104, tapered and angled front surfaces 106, and a bottom surface 102 for securing it to surface 98 of tool tip carrier 90. The front portion 105 of tool tip 100 is used for machining of a work piece under control of an actuator. Tool tip 90 can be implemented with, for example, a diamond slab.

Dual In-Line FTS Actuator

Figure 6A:
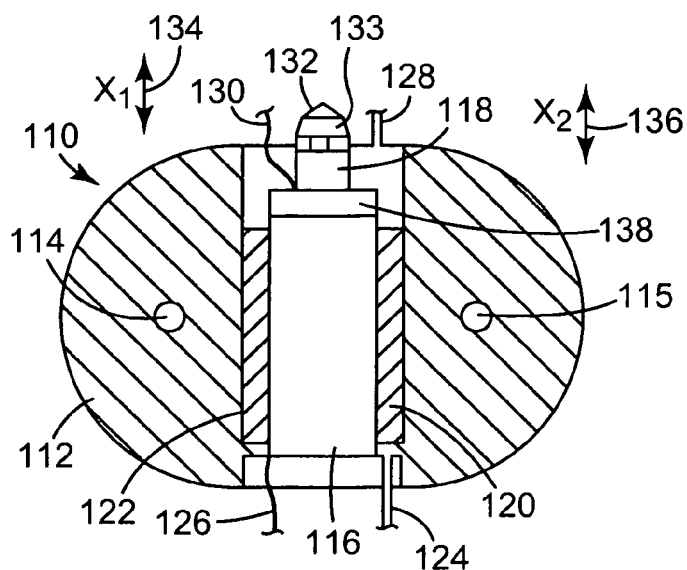
FIG. 6A is a top sectional view of a dual in-line actuator for use in a cutting tool.
Figure 6B:
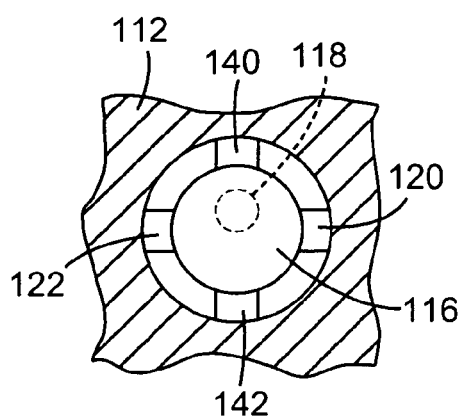
FIG. 6B is a side sectional view illustrating placement of a PZT stack in a dual in-line actuator.
Figure 6C:
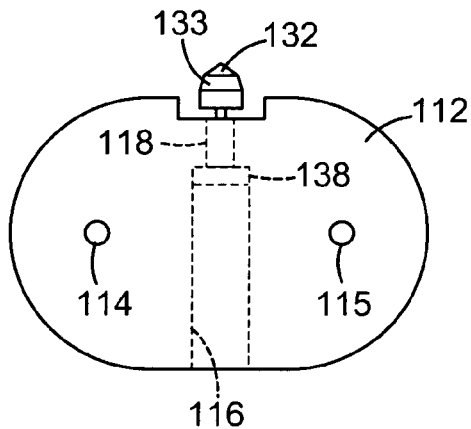
FIG. 6C is a top view of a dual in-line actuator.
Figure 6D:
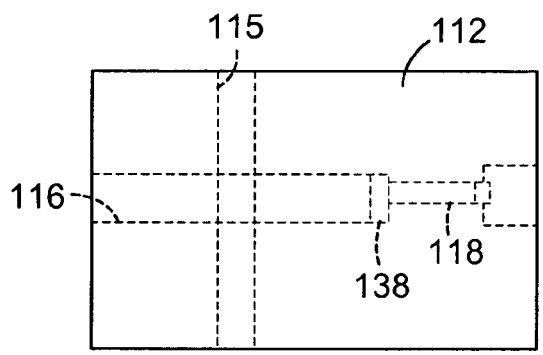
FIG. 6D is a side view of a dual in-line actuator.
Figure 6E:
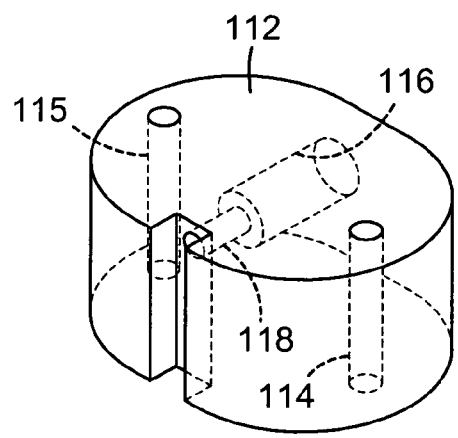
FIG. 6E is a perspective view of a dual in-line actuator.

FIGS. 6A-6E are views of an exemplary dual in-line actuator 110. The term "dual in-line actuator" refers to any type of actuator or other device that provides for movement of a tool tip in substantially an x-direction at two simultaneously independent speeds for use in machining a work piece. FIG. 6A is a top sectional view of dual in-line actuator 110. FIG. 6B is a side sectional view illustrating placement of a PZT stack in a dual in-line actuator 110. FIG. 6C is a top view of dual in-line actuator 110. FIG. 6D is a side view of dual in-line actuator 110. FIG. 6E is a perspective view of dual in-line actuator 110. Some details of dual in-line actuator 110 in FIGS. 6C-6E have been removed for clarity.

As shown in FIGS. 6A-6E, dual in-line actuator 110 includes a main body 112 capable holding a first x-direction PZT stack 116. A second x-direction PZT stack 118 is mounted to PZT stack 116 via a paddle 138. PZT stacks 118 and 116 are attached to a tool tip carrier 133 having a tool tip 132 for using in moving the tool tip in an x-direction at two simultaneously independent speeds, as shown by arrows 134 and 136. PZT stacks 118 and 116 can be implemented with the exemplary PZT stack 72 shown in FIG. 3. The tool tip 132 on carrier 133 can be implemented with the tool tip carrier shown in FIGS. 4A-4D and the tool tip shown in FIGS. 5A-5D. Main body 112 also includes two apertures 114 and 115 for use in mounting it to tool post 36, such as via bolts, for machining work piece 54 under control of computer 12.

PZT stack 116 is securely mounted in main body 112 for the stability required for precise controlled movement of tool tip 132. PZT stack 116 is secured in main body 112 by rails such as rails 120 and 122, and PZT stack 118 is secured to PZT stack 116 via paddle 138. The PZT stack 116 can preferably be removed from main body 112 by sliding it, with PZT stack 118 attached to it, along the rails and can be secured in place in main body 112 by bolts or other fasteners. PZT stacks 116 and 118 include electrical connections 126 and 130, respectively, for receiving signals from computer 12. The end cap of PZT stack 116 includes a port 124, and main body 112 includes a port 128, for receiving cooling fluid such as oil from reservoir 46, circulating it around the PZT stacks, and delivering the oil back to reservoir 46 for maintaining temperature control of it. Main body 112 can include appropriate channels for directing the cooling fluid around PZT stacks 118 and 116, and the cooling fluid can be circulated by a pump or other device in temperature control unit 52.

FIG. 6B is a side sectional view illustrating placement of PZT stack 116 in main body 112 with the end cap of PZT stack 116 not shown. Main body 112 can include a plurality of rails in each aperture for the PZT stacks to hold them securely in place. For example, PZT stack 118 is surrounded by rails 120, 122, 140, and 142 in order to hold it securely in place when mounted in main body 112. The end cap attached to PZT stack 116 can accommodate bolts or other fasteners to secure PZT stack to one or more of the rails 120, 122, 140, and 142, and the end cap can also provide for sealing PZT stack 118 in main body 112 for use in circulating the cooling fluid around it. PZT stack 118 can include one or more Belleville washers positioned between the stack and the tool tip carrier 132 for preloading of PZT stacks 116 and 118.

Figure 6F:
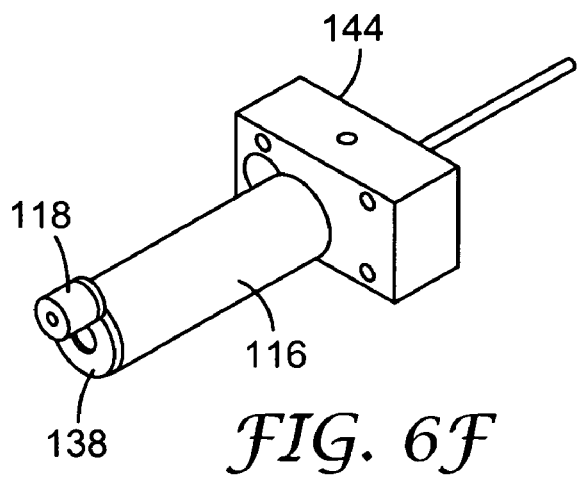
FIG. 6F is a perspective view illustrating mounting of two PZT stacks for a dual in-line actuator.

FIG. 6F is a perspective view illustrating mounting together PZT stacks 116 and 118 for placement within body 112. PZT stack 116 is mounted to an end cap 144. Paddle 138 is secured to PZT stack 116, and PZT stack 118 is also secured to paddle 138. The PZT stacks can be secured to paddle 138 using an adhesive, for example. Although PZT stack 118 moves with PZT stack 116, they are each independently controllable for movement in the x-direction. In certain embodiments, PZT stacks 116 and 118 are referred to as long and short PZT stacks, respectively.

Figure 7A:
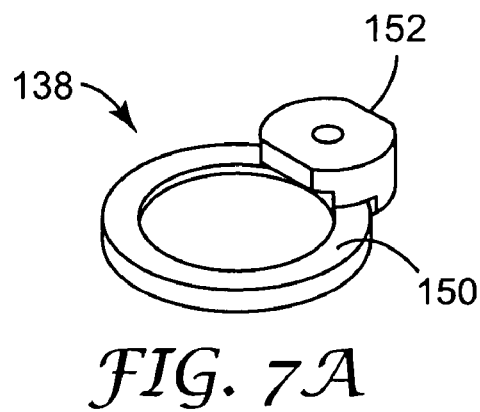
FIG. 7A is a perspective view of a paddle for mounting long and short PZT stacks in a dual in-line actuator.
Figure 7B:
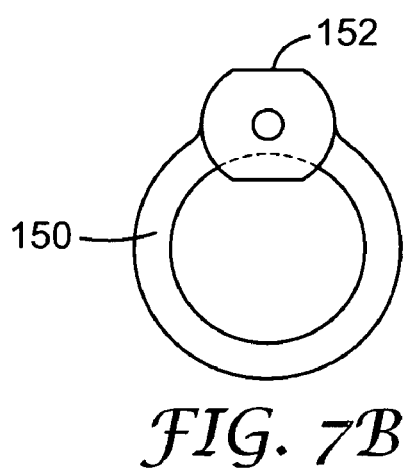
FIG. 7B is a front view a paddle for mounting long and short PZT stacks.
Figure 7C:
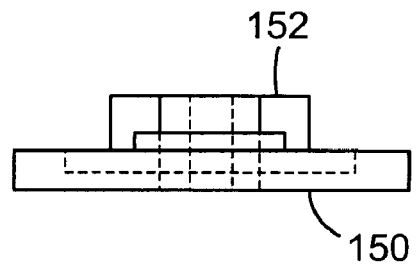
FIGS. 7C and 7D are side views a paddle for mounting long and short PZT stacks.
Figure 7D:
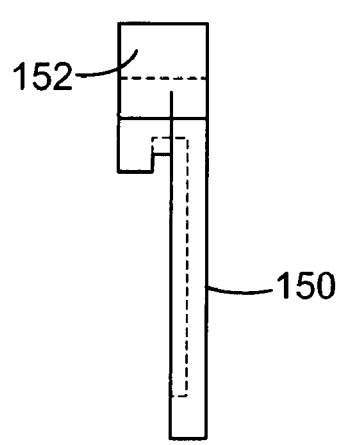

FIGS. 7A-7D illustrate in more detail paddle 138. FIG. 7A is a perspective view of paddle 138. FIG. 7B is a front view paddle 138. FIG. 7C and 7D are side views paddle 138. As shown in FIGS. 7A-7D, paddle 138 includes a ring portion 150 having a back surface for being secured to PZT stack 116. A front surface of ring portion 150 includes a mounting element 152 having a front surface for being secured to PZT stack 118. Paddle 138 is preferably made from titanium, and it can alternatively be made from other materials. For example, paddle 138 can alternatively be implemented with aluminum. A factor for a material to implement paddle 138 can include, for example, a strength to weight ratio of the material. Actuators 116 and 118 can be secured to paddle 138, as shown in FIG. 6F, by use of an adhesive, brazing, soldering, or in other ways.

Figure 8:
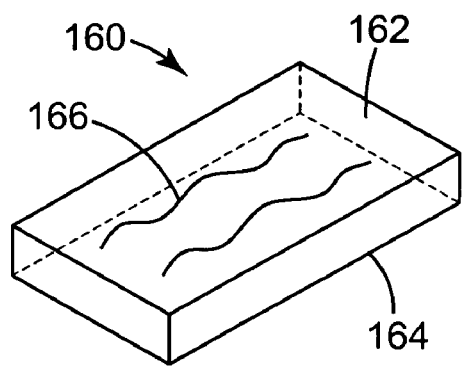
FIG. 8 is a diagram conceptually illustrating microstructures that can be made using the cutting tool system having a dual in-line actuator.

FIG. 8 is a diagram conceptually illustrating microstructures that can be made using the cutting tool system having a dual in-line actuator. As shown in FIG. 8, an article 160 includes a top surface 162 and a bottom surface 164. Top surface 162 includes microstructures as represented by lines 166, and those microstructures can be made using the actuators described above to machine a work piece and then using that work piece to make a film or article using a coating technique.

While the present invention has been described in connection with an exemplary embodiment, it will be understood that many modifications will be readily apparent to those skilled in the art, and this application is intended to cover any adaptations or variations thereof. For example, various types of materials for the tool post, actuator, and tool tip, and configurations of those components, may be used without departing from the scope of the invention. This invention should be limited only by the claims and equivalents thereof.

The invention claimed is:

1. A dual in-line actuator for use in machining a work piece, comprising:
   a main body having an aperture with an opening in the main body;
   a paddle having a first side and a second side opposite the first side;
   a tool tip carrier having a surface for mounting a tool tip;
   a first piezoelectric stack attached to first side of the paddle; and
   a second piezoelectric stack having a first end attached to the second side of the paddle and having a second end, opposite the first end, attached to the tool tip carrier,
   wherein the first and second piezoelectric stacks, attached via the paddle, are secured and preloaded in the aperture of the main body, and
   wherein the first piezoelectric stack moves the tool tip carrier in an x-direction substantially perpendicular to a surface of the work piece to be machined and the second piezoelectric stack moves the tool tip carrier in the x-direction substantially perpendicular to the surface of the work piece independent from the movement of the first piezoelectric stack.

2. The actuator of claim 1, further comprising a tool tip mounted on the surface of the tool tip carrier.

3. The actuator of claim 1, wherein the first and second piezoelectric stacks are each comprised of one of the following materials: barium titanate; lead zirconate; lead titanate; or a magnetostrictive material.

4. The actuator of claim 1, wherein the tool tip carrier has a planar back surface mounted to the second piezoelectric stack.

5. The actuator of claim 4, wherein the tool tip carrier has a tapered front surface opposite the planar back surface.

6. The actuator of claim 1, wherein the main body includes a port for receiving a cooling fluid in the aperture and channels in the aperture for directing the cooling fluid around the first and second piezoelectric stacks.

7. The actuator of claim 1, further including a Belleville washer for the preloading of the first and second piezoelectric stacks.

8. The actuator of claim 1, wherein the paddle is comprised of titanium.

9. The actuator of claim 1, wherein the main body is comprised of stainless steel.

10. The actuator of claim 1, wherein the main body is configured to be removably attached to a tool post.

11. An apparatus for machining a cylindrical work piece, comprising:
   a substantially cylindrical work piece mounted for rotational movement;
   a drive unit connected to the work piece for rotating the work piece;
   a tool post mounted on a track for movement substantially parallel to a surface of the work piece to be machined;
   an actuator mounted on the tool post, the actuator comprising:
      a main body having an aperture with an opening in the main body;
      a paddle having a first side and a second side opposite the first side;
      a tool tip carrier having a surface for mounting a tool tip;
      a first piezoelectric stack attached to first side of the paddle; and
      a second piezoelectric stack having a first end attached to the second side of the paddle and having a second end, opposite the first end, attached to the tool tip carrier,
      wherein the first and second piezoelectric stacks, attached via the paddle, are secured and preloaded in the aperture of the main body, and
      wherein the first piezoelectric stack moves the tool tip carrier in an x-direction substantially perpendicular to a surface of the work piece to be machined and the second piezoelectric stack moves the tool tip carrier in the x-direction substantially perpendicular to the surface of the work piece independent from the movement of the first piezoelectric stack; and a controller, connected to the drive unit and the actuator, for controlling the rotation of the work piece via the drive unit and the movement of the tool tip carrier via the first and second piezoelectric stacks.

12. The apparatus of claim 11, further comprising a tool tip mounted on the surface of the tool tip carrier.

13. The apparatus of claim 11, wherein the first and second piezoelectric stacks are each comprised of one of the following materials: barium titanate; lead zirconate; lead titanate; or a magnetostrictive material.

14. The apparatus of claim 11, wherein the tool tip carrier has a planar back surface mounted to the second piezoelectric stack.

15. The apparatus of claim 14, wherein the tool tip carrier has a tapered front surface opposite the planar back surface.

16. The apparatus of claim 11, wherein the main body includes a port for receiving a cooling fluid in the aperture and channels in the aperture for directing the cooling fluid around the first and second piezoelectric stacks.

17. The apparatus of claim 11, further including a Belleville washer for the preloading of the first and second piezoelectric stacks.

18. The apparatus of claim 11, wherein the paddle is comprised of titanium.

19. The apparatus of claim 11, wherein the main body is comprised of stainless steel.

20. The apparatus of claim 16, further comprising a cooling fluid reservoir connected to the port for delivering the cooling fluid to the aperture.

* * * * *

UNITED STATES PATENT AND TRADEMARK OFFICE
CERTIFICATE OF CORRECTION

PATENT NO. : 7,350,441 B2  Page 1 of 1
APPLICATION NO. : 11/273875
DATED : April 1, 2008
INVENTOR(S) : Alan B. Campbell It is certified that error appears in the above-identified patent and that said Letters Patent is hereby corrected as shown below:

Column 10,
Line 8, In Claim 18, delete "claim 1," and insert -- claim 11, --, therefor.
Line 10, In Claim 19, delete "claim 1," and insert -- claim 11, --, therefor.

Signed and Sealed this

Fifth Day of August, 2008

JON W. DUDAS
*Director of the United States Patent and Trademark Office*